United States Patent [19]

Beutier

[11] Patent Number: 4,568,525
[45] Date of Patent: Feb. 4, 1986

[54] METHOD FOR THE SELECTIVE DISSOLUTION OF LEAD FROM MIXED MINERALS CONTAINING ZINC

[75] Inventor: Didier Beutier, Paris, France

[73] Assignee: Societe Miniere et Metallurgique de Penarroya, Paris, France

[21] Appl. No.: 525,933

[22] Filed: Aug. 24, 1983

[30] Foreign Application Priority Data

Aug. 24, 1982 [FR] France ............................ 82 14561

[51] Int. Cl.⁴ .......................... B01F 1/00; C01G 3/05; C01G 3/12; C22B 3/00
[52] U.S. Cl. .................................. 423/38; 75/120; 423/42; 423/94; 423/98; 423/103; 423/109
[58] Field of Search .......... 423/98, 38, 42, 94, 423/103, 109; 204/118; 75/120

[56] References Cited

U.S. PATENT DOCUMENTS

| 629,856 | 8/1899 | Hoepfner | 204/118 |
|---|---|---|---|
| 799,862 | 9/1905 | Meaker | 204/118 |
| 1,838,857 | 12/1931 | Mitchell | 423/103 |
| 2,021,896 | 11/1935 | Platten | 423/94 |
| 3,998,628 | 12/1976 | Gandon et al. | 423/98 X |
| 4,097,271 | 6/1978 | Swinkels et al. | 423/42 X |
| 4,166,737 | 9/1979 | Demarthé et al. | 423/98 X |
| 4,260,588 | 4/1981 | Piret et al. | 423/37 |
| 4,276,084 | 6/1981 | Reynolds et al. | 75/101 R |
| 4,337,128 | 6/1982 | Haakonsen et al. | 423/98 X |

FOREIGN PATENT DOCUMENTS

| 2271298 | 12/1975 | France | 423/98 |
|---|---|---|---|
| 2346456 | 10/1977 | France | 423/98 |
| 2359211 | 2/1978 | France | 423/98 |
| 2387293 | 11/1978 | France | 423/98 |

Primary Examiner—G. L. Kaplan
Attorney, Agent, or Firm—Fleit, Jacobson, Cohn & Price

[57] ABSTRACT

The invention is concerned with a method for the selective dissolution of lead in relation to zinc that is present as a sulphurized compound.

The method comprises treating said compound to lixiviation with a solution containing ferrous chloride, while bubbling a gas that contains oxygen through the lixiviating solution.

8 Claims, 4 Drawing Figures

INFLUENCE OF THE POTENTIAL ON LEAD AND ZINC DISSOLUTION

METHOD FOR THE SELECTIVE DISSOLUTION OF LEAD FROM MIXED MINERALS CONTAINING ZINC

BACKGROUND OF THE INVENTION

1. Field of the Invention

The present invention has as its object a method for the selective dissolution of lead, in the presence of zinc in the form of a sulphurized compound.

It is concerned more particularly with a technique that makes it possible to prepare zinc concentrates that contain very little lead from lead-zinc concentrates.

2. Description of the Prior Art

During the last few decades, the classical minerals of blende and galena have been exhausted, and the new deposits which have been discovered are essentially micro-crystallized deposits of mixed minerals, the components of which are difficult to separate by the conventional techniques of differential flotation.

The mining industry currently finds itself confronted with two alternatives. The first possibility consists of performing a flotation separation. Flotation separation is expensive in terms of energy consumption, since these flotations require an extremely fine crushing process on the order of 10 micrometers. Additionally, flotation separation produces very low yields, in some cases less than 50%. The second possibility consists of obtaining mixed lead-zinc concentrates, the market value of which is low, inasmuch as those mixed concentrates cannot be processed in all zinc works, a fact that entails considerable commercial penalties.

Prior to the present invention, it has already been proposed, particularly in the French Patent Application filed by the Applicant and published under the number 2,359,221, that the lead be dissolved with the aid of cupric chloride.

No matter what interest that technique may have, it had, and still has, the serious disadvantage that the concentrate of zinc obtained in that manner is contaminated with considerable quantities of copper. That has a twofold disadvantage; in the first place, the loss of copper represents an unnecessary expense; and, in the second place, the zinc concentrate that is produced has diminished value in the marketplace because of the high percentage of copper that is present as an impurity.

The teaching of the above patent with slight variants has been confirmed by the Disburger Kupferhutte U.S. Pat. No. 4,260,588 and by Hazen Research Inc. U.S. Pat. No. 4,276,084. However, each of those variants have the same disadvantages as described in the preceding paragraph. Thus, a need has continued to exist for a method that makes it possible to produce a zinc concentrate uncontaminated with copper.

SUMMARY OF THE INVENTION

One of the objects of the present invention is to provide a method for producing a concentrate, the essential component of which is zinc, in the form of sulphide, and the impurities of which are elemental sulphur, from a mixed lead-zinc concentrate.

It is another object of this invention to provide a method for dissolving the lead selectively towards zinc from lead zinc sulfide concentrates to obtain a lead chloride solution with a low level of zinc.

It is still another object of this invention to provide a method for producing a concentrate of zinc which is essentially devoid of lead and which does not require expensive fine grinding.

It is yet another object of this invention to provide a method for producing a concentrate, the essential component of which is zinc, in the form of a sulphide, and which is essentially devoid of lead and, additionally, which provides economically satisfactory yields.

These objects have been achieved by means of a method for the selective dissolution of lead in relation to the zinc that is present. The method comprises subjecting the zinc sulphide-containing concentrates to lixiviation in a solution containing ferrous chloride, while bubbling an oxygen-containing gas through the lixiviating solution.

DESCRIPTION OF THE PREFERRED EMBODIMENT

Figure 1:
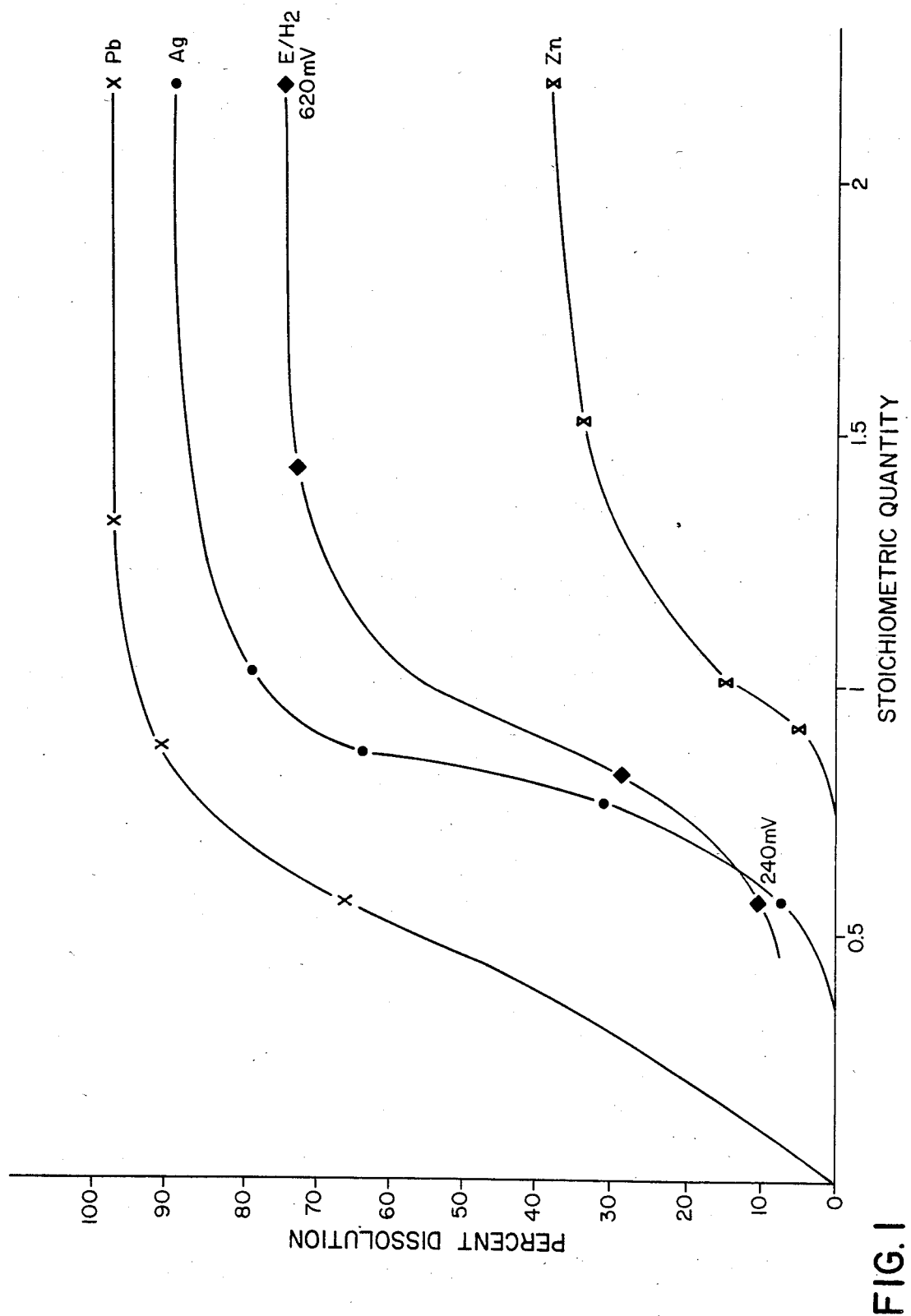
FIG. 1 is a representation of the selectivity curves obtained in the dissolution of the lead and silver in relation to the zinc as a function of the ferric iron placed into contact with the concentrate.
Figure 2:
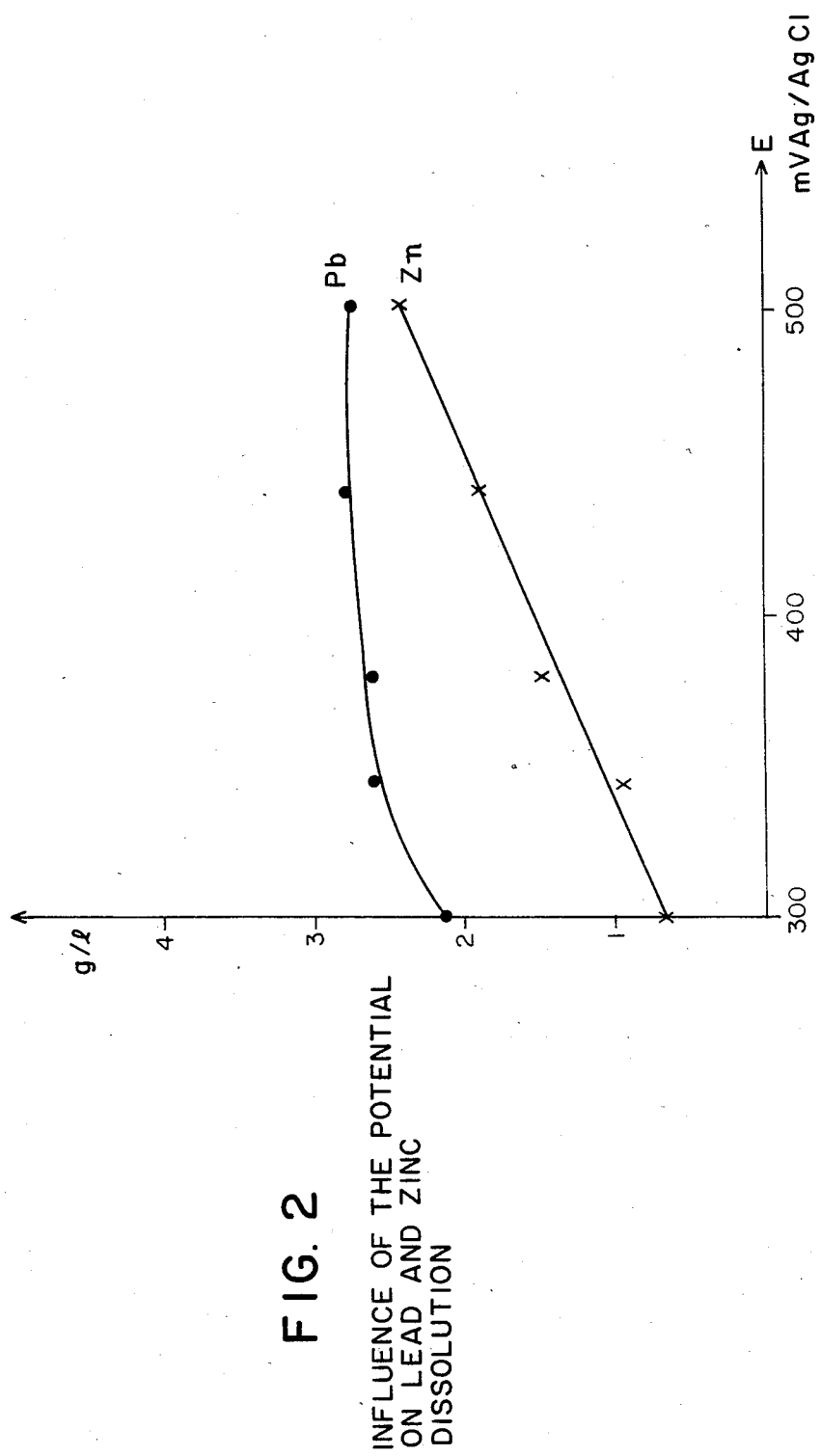
FIG. 2 illustrates the influence of the redox potential on the selectivity of the leaching.
Figure 3:
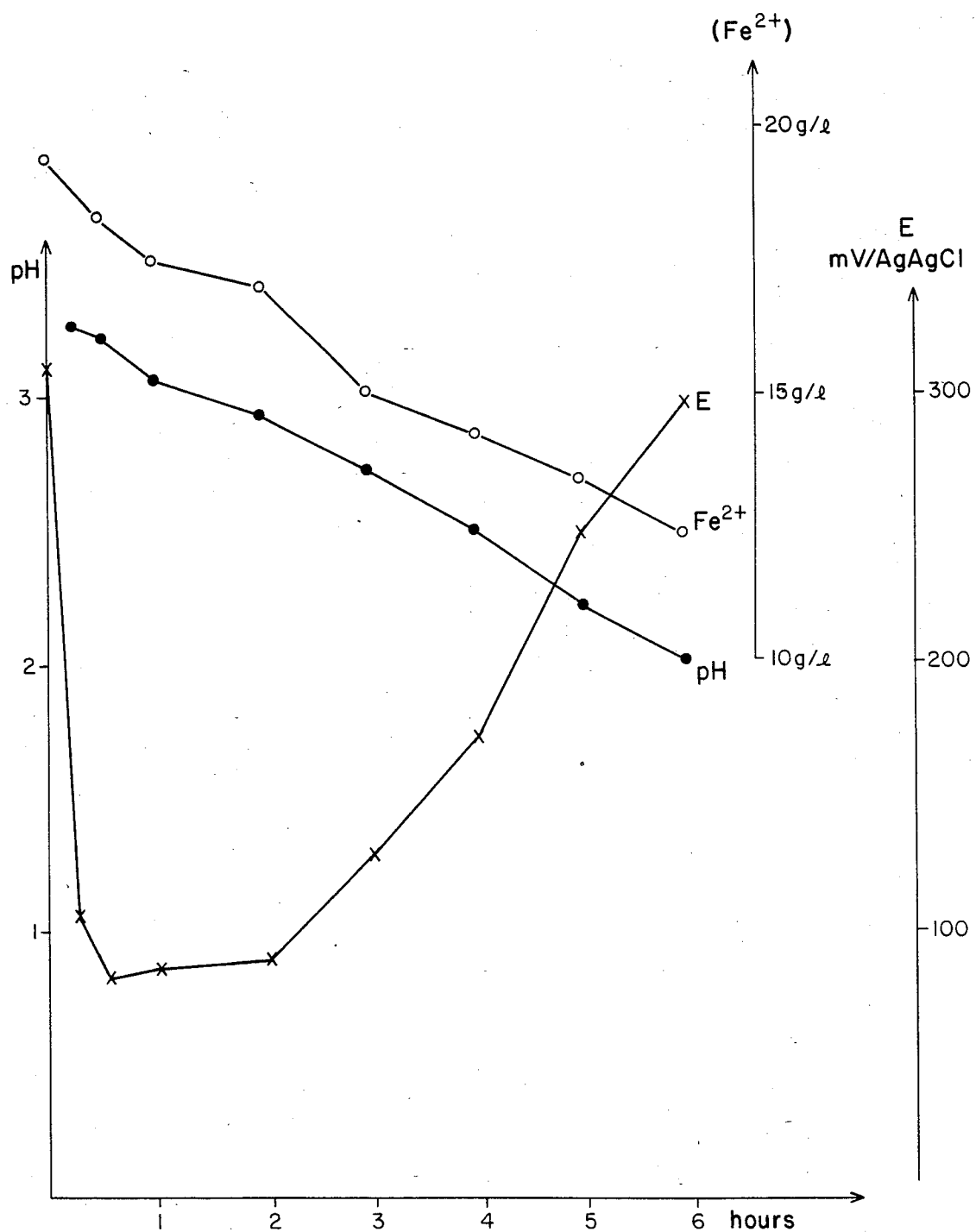
FIG. 3 is a representation of the ionic species activity in the reaction system as a function of time.
Figure 4:
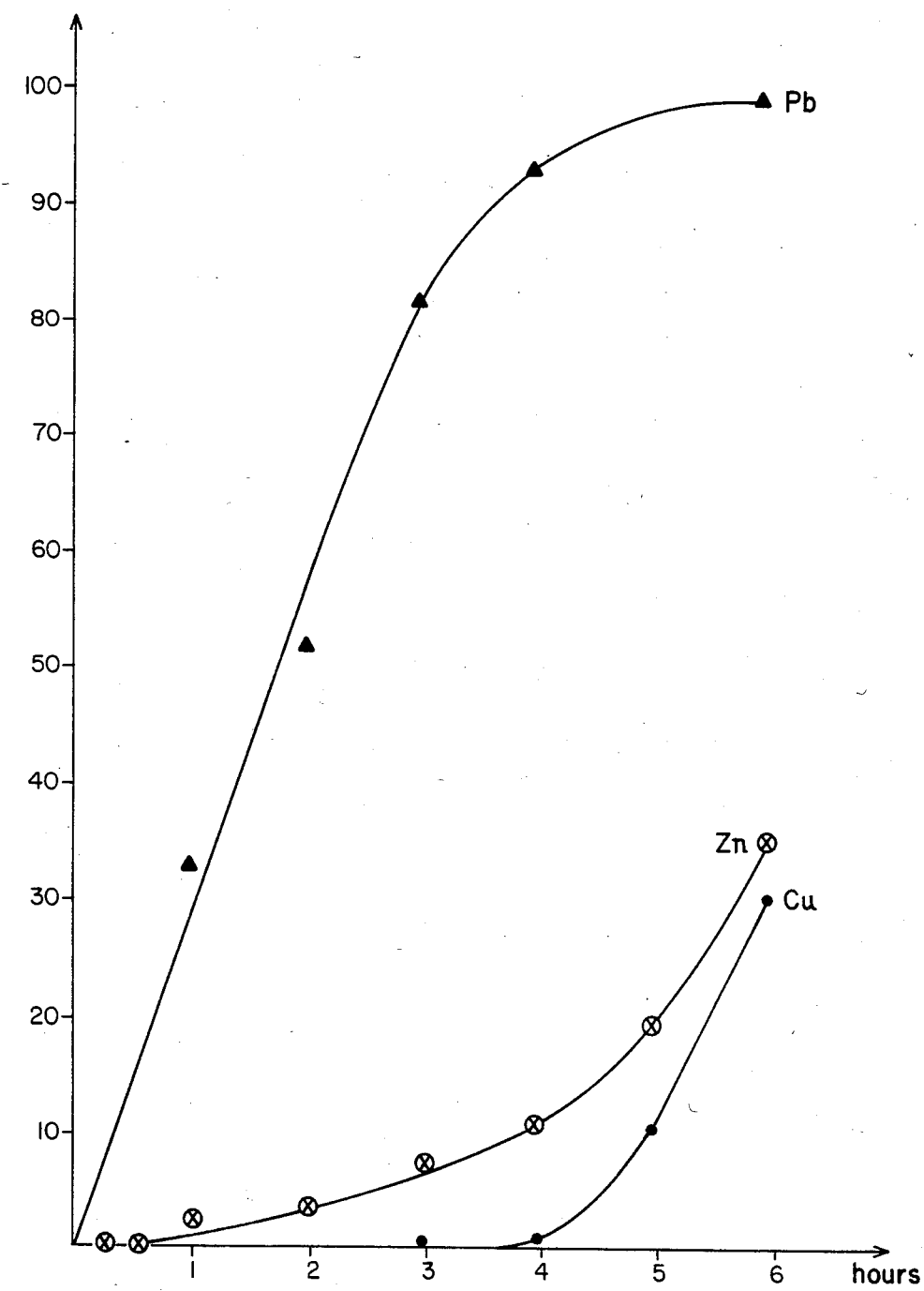
FIG. 4 illustrates the high degree of selectivity obtained with the method of the present invention.

In order to achieve a good result, a compromise has to be found as to the temperature. As a matter of fact, the test carried out in the course of the research that has led to the present invention have shown that in order to increase the selectivity of dissolution of lead in the presence of zinc, it is preferable to perform the lixiviation at a temperature that is as low as possible. In contrast, in order that the goethite formed in the course of the reaction, as expressed by the equation (1):

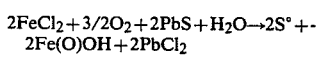

$$2FeCl_2 + 3/2O_2 + 2PbS + H_2O \rightarrow 2S° + 2Fe(O)OH + 2PbCl_2$$

be easily filterable, the temperature must exceed 60° C. Thus, it is preferable to choose a temperature between approximately 60° C. and 100° C., thereby achieving good precipitation of the goethite and a good selectivity with regard to the zinc.

In order to achieve good selectivity as to the zinc, it is necessary that the pH be greater than about 1.5; advantageously the pH is greater than about 2. The most preferred pH range is greater than about 2.5.

It must be recognized, however, that as the pH becomes higher, the rate of dissolution of the lead slows down. The pH may be adjusted by controlling the flow of oxygen-containing gas. The pH may also be controlled by the addition of acid, e.g., hydrochloric acid. However, the addition of hydrochloric acid, when made, must be very slow in order to prevent a considerable parasitic "redissolution" of the goethite. This parasitic "redissolution" may result in the release of rather large amount of ferric iron which is harmful to the selectivity of the lixiviation. It is a matter of course that, in the case of an excessively acid pH, the adjustment may be performed by the addition of a base, e.g., of lead oxide or of alkaline, alkaline-earth hydroxide, and/or ammonia. However, addition of a base is to be avoided where possible.

Another means to increase the selectivity of said lixiviation is the selection of a relatively coarse granulometry of the mineral, e.g., a granulometry that is characterized by a $d_{80}$ of the product to be lixiviated of greater than about 50 micrometers, preferably greater than about 100 micrometers, most preferably greater than about 200 micrometers.

A $d_{80}$ of 50 micrometers is defined as a particle size distribution such that 80% of the particles will pass through a 50 micrometers screen. A further description of this particle size measurement may be found in U.S. Pat. No. 4,175,790, incorporated by reference herein.

Another means to increase the selectivity of said lixiviation is to choose a rather high ferrous iron concentration that is advantageously at least equal to 10 g/l, preferably between 50 and 100 g/l (one significant figure). The rate of lixiviation increases also with the ferrous iron concentration.

Another means to increase the rate of the lixiviation is to increase the partial pressure of oxygen, e.g., to use plain oxygen or even to perform the lixiviation under an oxygen pressure higher than the atmospheric pressure. It may be mentioned that the selectivity of the lixiviation towards the zinc is only a kinetic phenomenon since thermodynamical calculations show that zinc should be leached first. Consequently, as far as the conditions required for selectivity are complied with, it is preferable to choose the conditions increasing the kinetic rate of the leaching.

Another way to increase the speed of the lixiviation is to add a catalyst promoting the rate of ferrous ion oxidation. The best catalyst known in the art is the copper present obviously either in the cuprous or cupric form. But on one hand copper hardly exists in solution when galena is present in the pulp at redox potential (between about 600 and 250 mV with reference to hydrogen electrode, generally between 500 and 300 mV) fixed by the lixiviation conditions (pH essentially) and on the other hand the presence of copper is not wished; in any case copper should be lower than 0.5 g/l preferably lower than 0.1 g/l.

However other catalysts, such as ammonium and/or chromium ion, may be used, but the latter are deemed rather poor catalysts.

Two possibilities exist for separating the lead, that of keeping the lixiviated lead in solution or that of precipitating the lixiviated lead with the residue. In the first case, it is appropriate to add complexing chloride ions, i.e., chloride ions in the form of ammonium, alkaline chlorides, or alkaline-earth chlorides. The concentration of complexing chloride ions should be greater than about 2 gram-equivalents per liter, preferably greater than 4 gram-equivalents per liter.

It is also possible to add as complexing agent ferrous chloride in excess to the stoichiometric amount as defined by equation (1). In this case, the ferrous chloride behaves on one hand as complexing agent and on the other hand as promoting agent for selectivity and kinetic rate. However, the ferrous chloride is not a complexing agent as good as the other agents, e.g., sodium chloride or calcium chloride.

In the second case, the chosen amount of lead that is present in the pulp is greater than the amount of lead that is capable of dissolution by the aqueous phase, the lead chloride that will be formed subsequently by lixiviation will be precipitated in the form of lead chloride. This lead chloride may then be recovered and separated from the goethite, and from the zinc sulphide formed in that way, by means of any of the physical techniques known to the art, such as flotation, elutriation, or densimetric separation. In this case, to obtain a low solubility of lead chloride, the concentration of complexing chloride ions should be less than about 1.5 gram-equivalents per liter.

It is also possible to subject the entire residue to the action of ammonium, alkaline-earth, and/or alkaline chloride solutions and their mixtures in such a way as to dissolve the lead chloride, preferably while hot. It is possible to recover the lead chloride by treating with metallic iron in the form of powder or turnings. The resulting product is a cement lead compound, which is of commercial value, and regenerated ferrous chloride that can be recycled to the present lixiviation.

One means to practice the present invention comprises the in situ production of ferrous chloride from ferric chloride—if one has ferric chloride, directly or indirectly, at his disposal—establishing contact between the compound that contains the lead sulphide or galena and a solution of ferric chloride, while the introduction of ferric chloride into the mixture of the reaction is adjusted in such a way that the "redox" voltage will not amount to more than 650, advantageously 550, and by preference 450 millivolts in relation to the hydrogen electrode. The introduction into the reaction mixture may be realized either by adding a concentrated solution of ferric chloride at an adequate rate, or by the slow addition of hydrochloric acid to a reaction medium containing, beside the mineral or the concentrate containing the galena, an iron III oxide such as one of those of the group consisting of the soluble oxides, the hydroxides, the hydroxy-oxides, and the carbonates.

It is necessary that the amount of ferric iron introduced in that manner described above be less than 0.7 times the amount that is stoichiometrically necessary to dissolve all the lead that is present in the ore or in the concentrate, by the following reaction:

$$2FeCl_3 + PbS \rightarrow S° + 2FeCl_2 + PbCl_2$$

In any case, it is preferable that the amount of ferric iron introduced not exceed 30 to 40% of the stoichiometric amount as defined above.

Having now generally described the invention, a greater understanding can be obtained by reference to the following example, which is provided herein for purposes of illustration only and is not intended to be limiting unless otherwise specified.

EXAMPLE 1

Plotting of curves of selectivity of the attack of lead and of silver in the presence of zinc.

An impure galena concentrate the composition of which is as follows:

| | | | |
|---|---|---|---|
| Lead: | 65% | Sulphur: | 19.6% |
| Zinc: | 4% | Iron: | 7.5% |
| Silver: | 0.13% | Gang: | complement to 100% |
| $d_{80}$ = 150 micrometers | | | | is subjected, at a temperature of 90° C., to the action of a solution with the following composition:
 NaCl = 250 g/l
 $Fe^{2+}$ = 10 g/l (in the form of $FeCl_2$)
 $Fe^{3+}$ = depending on the amount tested.

The concentrate is mixed with the solution at a ratio of 30 grams per liter of solution. The kinetics for each selected and tested value of ferric iron are measured with the aid of random sampling after 1; 2.5; 8; 16; 32; 60, and 120 minutes. The values indicated for the selectivity curves in the figure are values obtained after 2 hours (120 min.), at a point where the solution may be considered as having been in equilibrium for a long period of time. The curve indicates the selectivity obtained in the dissolution of the lead and of the silver in relation to the zinc as function of the ferric iron placed into contact with the concentrate, said amount being expressed as a function of the stoichiometric quantity.

EXAMPLE 2

Influence of the redox potential on the selectivity of the leaching
The composition of the sulfide ore used is:

| Pb: | 1.0% | S: | 52.8% |
|---|---|---|---|
| Zn: | 2.86% | Fe: | 41.1% |
| Cu: | 0.95% | Gangue: | complement to 100% |
| $d_{80}$ = 180 micrometers | | | |

One liter of a solution containing:
$Fe^{2+}$: 10 g/l
NaCl: 250 g/l
$Fe^{3+}$: depending on the potential wished
pH: 1.6
temperature: 66° C.
pulp ratio: 300 g/l
duration of the leaching: one hour
is used for leaching, the potential being maintained constant by addition of ferric chloride solution, the elements present in solution being determined by X-ray fluorescence. The potential is measured towards a reference electrode of Ag/AgCl whereof standard potential is +220 mV towards hydrogen electrode. The results are summarized in the following curve.

One may mention that the selectivity is very good taking into account that the zinc content of the ore is three times the one of lead. This evidences that it is possible to produce in situ a ferrous chloride by adding very slowly and in a way controlled by the redox potential ferric chloride.

EXAMPLE 3

Lixiviation according to the invention by bubbling pure oxygen into ferrous chloride solution
The composition of the sulfide ore used is:

| Pb: | 8.5% | S: | 48% |
|---|---|---|---|
| Zn: | 7.7% | Fe: | 25.6% |
| Cu: | 12% | Gangue: | complement to 100% |
| Granulometry: $d_{80}$ = 40 micrometers. | | | |

Conditions of lixiviation:
$Fe^{2+}$: 0.36 M
$CaCl_2$: 4 M
pH: 2.0
temperature: 80° C.
pulp ratio: 150 g/l
Oxygen rate: 10 l/hour.
The elements are determined by atomic absorption and the results are given in the following curves. The figure b shows that after 3 hours more than 90% of the lead is dissolved whereas less than 10% of zinc is dissolved. It should be stressed that copper is in no way dissolved at such redox potential. The redox potential is measured towards Ag/AgCl electrode.

EXAMPLE 4

Lixiviation of an ore in very reducing conditions
The composition of the sulfide ore used is:

| Pb: | 23.4% | Cu: | 2.74% |
|---|---|---|---|
| Zn: | 24.1% | Fe: | 21.0% |

Lixiviation conditions:
Initial solution (1 liter):
$Fe^{2+}$: 42 g; $Fe^{3+}$: 0
NaCl: 250 g/l
temperature: 70° C.
Pulp ratio: 150 g/l
Oxygen rate: 0.2 l/hour.
Kinetic rate:

| Hours | pH | E mV/Ag.AgCl | Pb g/l | Zn g/l | Cu g/l |
|---|---|---|---|---|---|
| 0 | 2.2 | 0 | <0.05 | <0.05 | <0.05 |
| 1 | 2.81 | 44 | 0.96 | " | " |
| 2 | 2.70 | 44 | 1.54 | " | " |
| 3 | 2.64 | 44 | 2.14 | " | " |
| 4 | 2.57 | 64 | 2.63 | " | " |
| 5 | 2.41 | 84 | 4.58 | " | " |
| 6 | 2.37 | 85 | 5.20 | " | " |
| 7 | 2.33 | 83 | 5.89 | " | " |

This example shows the very high selectivity of the leaching process in extreme conditions, when the oxygen rate is very low. The lead is dissolved slowly but the selectivity towards zinc and copper is very high.

EXAMPLE 5

Lixiviation of a matte lead-copper by the couple $Fe^{2+} + O_2$
The composition of the matte is:
Pb: 51.4%
Cu: 11.0%
S: 12%
Granulometry: 200 micrometers
Lixiviation conditions:
Initial solution (1 liter):
$CaCl_2$: 4 M
$FeCl_2$: 0.36 M
Final pH: 2
temperature: 85° C.
Pulp ratio: 70 g/l
Oxygen rate: 10 l/hour.
Results:
When the matte is introduced, one observes a rise of the pH till 4. The leaching goes on during 8 hours; the pH decreases to the value 2.5. After filtration of the residue, the filtrate is recovered and washed by a hot sodium chloride solution, then by hot water. The residue is filtered, dried, weighted. Its weight is 47 g and it contains 3% lead, 15.6% copper. The dissolution yield of the lead is 96% and for the copper less than 5%. Measurements made on the solution show that in fact the dissolution yield for the copper is under 0.2%. One may mention that the few percent of zinc contained in the matte seems not dissolved at all since no zinc was detected in the solutions.

It should be stressed that the selectivity towards copper is very high and consequently it is possible to leach selectively lead from concentrates containing copper and lead and this is why a process of leaching selectively. lead towards copper should be considered as a part of the present claimed process although the phenomena involved by this selectivity are very different from the ones towards zinc and although such a process is less interesting since it will be in competition with the process cited in the French Pat. No. 2,359,211.

Having now fully described the invention, it will be apparent to one of ordinary skill in the art that many changes and modifications can be made thereto without departing from the spirit and scope of the invention as set forth herein.

What is claimed is:

1. Method for the selective dissolution of lead from mixed minerals containing zinc or zinc and copper to produce a concentrate which contains zinc or zinc and copper as the primary component, said zinc or zinc and copper being present as a sulphurized compound, said method comprising subjecting said mixed minerals to lixiviation with a solution containing ferrous chloride having less than 0.5 gm/l of copper while bubbling an oxygen containing gas through the lixiviating solution at a rate sufficient to maintain the pH of the solution at a value greater than 1.5.

2. Method in accordance with claim 1 wherein the lixiviation is performed at a temperature of between 60° and 80° C.

3. Method in accordance with claim 1 and further comprising addition of complexing chloride ions at a concentration greater than about 2 gram-equivalents per liter.

4. Method in accordance with claim 1 wherein the period of lixiviation is between about 3 and 10 hours.

5. Method in accordance with claim 1 wherein the $d_{80}$ of the product to be lixiviated is greater than about 50 micrometers.

6. Method in accordance with claim 1 wherein the amount of lead that is present in said mixed minerals exceeds the amount of lead that is capable of being dissolved by the aqueous phase and wherein the lead chloride formed by the lixiviation is precipitated in the form of lead chloride.

7. Method in accordance with claim 6 and further comprising separating the solid product of the lixiviation and treating said solid product with a heated solution of complexing chloride selected from the group consisting of ammonium alkaline earth chlorides and alkali metal chlorides.

8. Method in accordance with claim 1 and further comprising separating the goethite that has been formed by means of flotation.

* * * * *